United States Patent
Cullen et al.

[11] Patent Number: 5,148,337
[45] Date of Patent: Sep. 15, 1992

[54] CONTROLLED RATE ADSORBENT AND DISC DRIVE STABILIZING UNIT

[75] Inventors: John S. Cullen, Buffalo; Samuel A. Incorvia, Tonawanda; Christopher S. Nigon, Orchard Park, all of N.Y.

[73] Assignee: Multiform Desiccants, Inc., Buffalo, N.Y.

[21] Appl. No.: 585,172

[22] Filed: Sep. 20, 1990

[51] Int. Cl.⁵ .................................................. G11B 33/14
[52] U.S. Cl. .................................. 360/97.04; 360/128; 360/133
[58] Field of Search ................. 360/128, 97.04, 137, 360/133; 206/444

[56] References Cited

U.S. PATENT DOCUMENTS

| | | | |
|---|---|---|---|
| 3,990,872 | 11/1976 | Cullen | 55/274 |
| 4,433,024 | 2/1984 | Elan | 428/198 |
| 4,488,645 | 12/1984 | Yamaguchi | 206/444 |
| 4,517,308 | 5/1985 | Ehlenz et al. | 502/401 |
| 4,586,606 | 5/1986 | Howey | 206/444 X |
| 4,614,528 | 9/1986 | Lennen | 55/387 |
| 4,654,057 | 3/1987 | Rhodes | 55/208 |
| 4,830,643 | 5/1989 | Sassa et al. | 55/316 |

FOREIGN PATENT DOCUMENTS

| | | | |
|---|---|---|---|
| 11890 | 1/1979 | Japan | 55/389 |
| 119418 | 9/1980 | Japan | 55/389 |
| 9880 | 1/1986 | Japan | 206/444 |
| 199020 | 11/1988 | Japan | 55/358 |
| 13529 | 3/1989 | Japan | 55/275 |
| 2173478 | 10/1986 | United Kingdom | 206/444 |

Primary Examiner—A. J. Heinz
Attorney, Agent, or Firm—Joseph P. Gastel

[57] ABSTRACT

A combined controlled rate adsorbent and disc drive stabilizing unit in the shape of a computer disc including an adsorbent of planar shape, a casing of porous material having a predetermined water vapor transmission rate encasing the adsorbent for prolonging the water vapor adsorption time of the adsorbent, and a self-sustaining jacket on the casing of a shape for installation into a computer disc drive during transit.

6 Claims, 1 Drawing Sheet

CONTROLLED RATE ADSORBENT AND DISC DRIVE STABILIZING UNIT

BACKGROUND OF THE INVENTION

The present invention relates to a combined controlled rate adsorbent and disc drive stabilizing unit in the shape of a computer disc for installation into a computer disc drive to both adsorb water vapor from the carton in which it is packaged and to stabilize it during transit.

By way of background, in the past computer disc drives were shipped with a piece of cardboard in the disc drive to stabilize it in transit, and a separate packet of desiccant was enclosed in the shipping carton to adsorb moisture for preventing damage due to humidity.

SUMMARY OF THE INVENTION

It is accordingly the objects of the present invention to provide a combined controlled rate adsorbent and disc drive stabilizing unit which is approximately the size of a computer disc so that it can be placed in the disc drive in the position normally occupied by a computer disc, to thereby both stabilize the disc drive and adsorb water vapor from the carton in which the disc drive is stored and transported; which has a controlled rate of water vapor adsorption so that it has a relatively long effective life; which confines any adsorbent dust therein to thereby prevent it from being deposited on the disc drive with which it is stored; and which may have a humidity indicator incorporated thereon for showing its condition. Other objects and attendant advantages of the present invention will readily be perceived hereafter.

The present invention relates to a combined adsorbent and computer disc drive stabilizing unit for placement into a computer disc drive comprising a self-sustaining member for fitting into a disc drive in the manner of a computer disc, and desiccant means carried by said self-sustaining member.

The various aspects of the present invention will be more fully understood when the following portions of the specification are read in conjunction with the accompanying drawings wherein:

DESCRIPTION OF THE PREFERRED EMBODIMENTS

Summarizing briefly in advance, the combined controlled rate adsorbent and computer disc drive stabilizing unit 10 is for installation in a computer disc drive which is being packaged. It serves a dual function of replacing a cardboard card which was previously used to stabilize the disc drive in transit and the additional purpose of replacing a packaged desiccant which was included in the carton in which the disc drive was being shipped. When the disc drive is installed in its permanent location and the combined unit 10 has been removed, there is the assurance that an independent package of desiccant has not been left behind.

Figure 1:
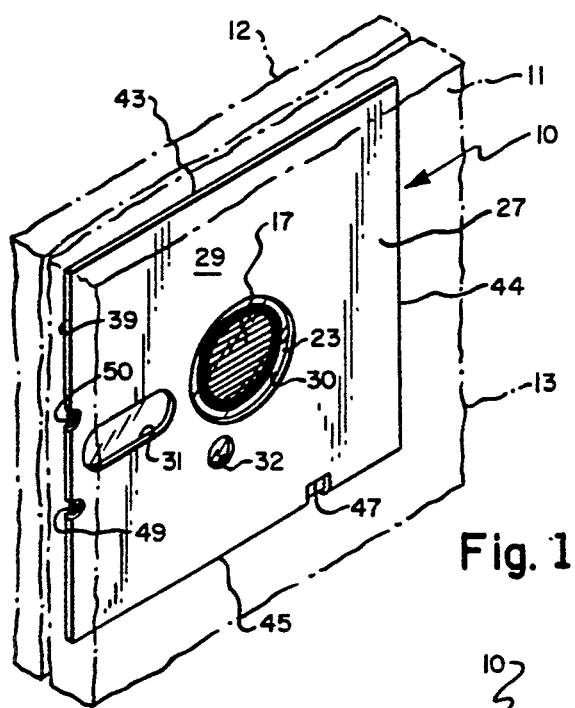
FIG. 1 is a fragmentary perspective view of the combined controlled rate adsorbent and computer disc drive stabilizing unit shown in a schematically represented computer disc drive.
Figure 4:
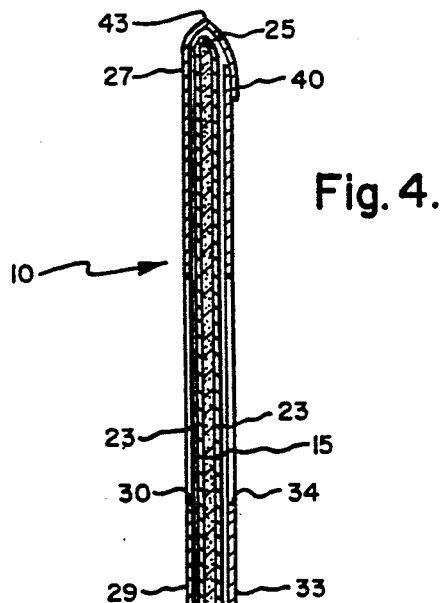
FIG. 4 is a cross sectional view taken substantially along line 4—4 of FIG. 2.
Figure 2:
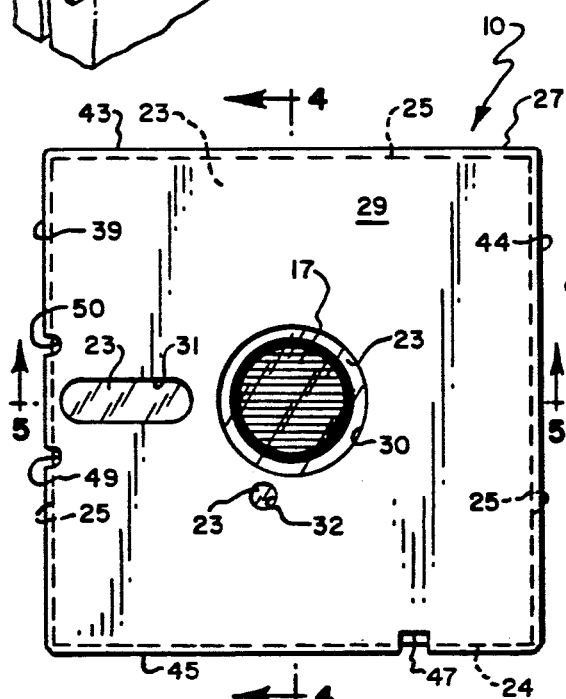
FIG. 2 is a plan view of one face of the controlled rate adsorbent and computer disc drive stabilizing unit.
Figure 3:
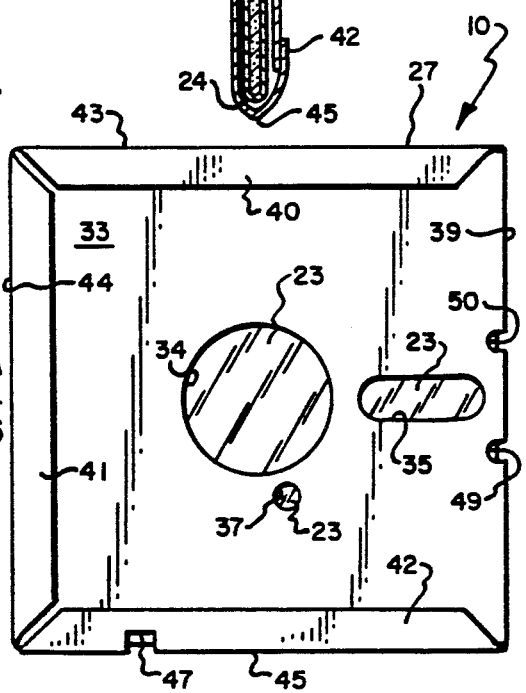
FIG. 3 is a plan view of the opposite face of the unit of FIG. 2.
Figure 5:
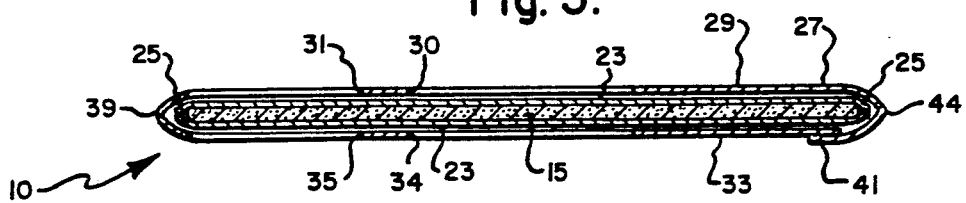
FIG. 5 is a cross sectional view taken substantially along line 5—5 of FIG. 2.

The combined controlled rate adsorbent and computer disc drive stabilizing unit 10 is shown in FIG. 1 between the schematically represented parts 11 and 12 of the disc drive 13.

The combined controlled rate adsorbent and computer disc stabilizing unit 10 includes a sheet of desiccant paper 15 which is commercially available and which contains cellulose fiber with approximately two-thirds fine particles of dry silica gel desiccant. One side of paper 15 is printed in a circular configuration at 17 with a humidity indicating substance, namely, cobalt chloride. Cobalt chloride is blue when the desiccant paper 15 is dry and turns pink when the desiccant paper 15 has adsorbed a predetermined amount of moisture. The use of the foregoing scheme for humidity indication is well known and by itself does not constitute a novel part of the present invention. While the unit 10 has been depicted with the humidity indicating material printed thereon, it will be appreciated that it need not be used, that is, the unit 10 can be used without it. In this event a separate humidity indicating card may be used if humidity indication is required or desired. A desiccant paper 15, which has been found satisfactory, is known under the trademark NATRASORB® G-145, and is 54 mils thick and contains 44 grams of silica gel per square foot. However, any desired thickness of paper containing any desired amount of adsorbent or desiccant can be used, depending on requirements for its use.

A casing 23 confines the sheet of desiccant paper 15 therein. Casing 23, in the present instance, is a polyvinyl chloride film which has been shrunk-wrapped around desiccant paper 15. More specifically, casing 23 is fabricated by folding it along edge 24 and heat-sealing the remaining edges 25 to each other to thereby completely confine the desiccant paper 15 within casing 23. The PVC, after edges 25 have been sealed, is heat-shrunk to provide an extremely smooth surface to both sides of the controlled rate adsorbent 10. The casing 23 prevents dust from the silica gel from passing out of the casing and being deposited on the disc drive. If desired, a plurality of sheets of desiccant paper can be placed within a casing, to thereby increase the vapor adsorbing capacity of the unit 10.

The polyvinyl chloride casing 23 can have a broad range of vapor transmission, namely, 5 to 15 grams of water vapor per hundred square inches per day. The polyvinyl chloride may be of any desired thickness to obtain the desired rate of water vapor transmission. In the specific example shown, it is 50 gauge, but it can be up to 150 gauge, or, in fact, any thickness, depending on the desired rate of vapor transmission. The controlled rate of vapor transmission extends the shelf life of the adsorbent paper compared to the shelf life which would be obtained in the absence of the controlled rate. Thus, the adsorbent unit 10 can effectively dehumidify the carton in which the disc drive is placed. It will not lose its potency rapidly even if it is placed for short periods of time in an extremely humid environment before it is placed in its ultimate position in the disc drive. At this point, it is to be noted that before the disc drive is placed in its shipping carton, it is usually placed in a sealed plastic bag, so that the main function of the desiccant is to adsorb any water vapor in the plastic bag which at the very most transmits water vapor at a very slow rate, if at all.

The foregoing casing 23 containing the adsorbent paper 15 is located in a self-sustaining paper or plastic jacket 27 of the type which normally contains a computer disc. This jacket 27 includes a front face 29 having an aperture 30 therein through which the humidity indicator 17 can be viewed. It also contains an oblong opening 31 and a small circular opening 32. Openings 30, 31 and 32 are those normally associated with a computer disc jacket. The jacket 27 also includes a rear face 33 having a circular opening 34, an oblong opening 35, and a small circular opening 37 which are diametrically opposite to openings 30, 31 and 32, respectively. Rear face 33 is a continuation of front face 29 which has been bent around edge 39. The front face 29 and rear face 33 are secured in position by flaps 40, 41 and 42 which are continuations of front face 29 which have been bent around edges 43, 44 and 45, respectively. In addition, the jacket 27 has edge cutouts 47, 49 and 50 therein. Thus, jacket 27 completely resembles a jacketed computer disc except that jacket 27 contains a sheet of desiccant paper 15 within a completely sealed casing 23 having a controlled moisture transmission rate.

The combined controlled rate adsorbent and computer disc drive stabilizing unit 10 is thus of substantially the same shape for convenient installation in the disc drive 13. It is non-dusting so as not to adversely affect the disc drive. In this respect, the casing 23 confines any dust from the dessicant. It is indicating to show its condition, namely, whether it is active or whether it is saturated with water. It adsorbs water vapor at a controlled rate to thereby not only prevent moisture from adversely affecting the disc drive 13 but also to remain active for a relatively long time regardless of being placed in extremely humid environments. The controlled rate adsorbent unit 10 will remain active for approximately four weeks in a high humidity environment and thus it may be exposed for long periods of time before being hermetically sealed with a disc drive. When the disc drive is finally packaged in a carton for shipping, the latter will provide a barrier to transmission of water vapor to its inside, and thus the adsorbent unit 10 will only be subjected to the amount of water vapor within the carton, and thus when it has adsorbed the water vapor therein, it will continue to remain active to adsorb any additional water vapor which may leak into the carton at a low rate.

While the adsorbent paper has been described as containing silica gel, it will be appreciated that it can contain any suitable adsorbent, such as molecular sieve, clay, or calcium sulfate, by way of example and not of limitation. Furthermore, while the casing 23 has been described as polyvinyl chloride, it will be appreciated that it can be any type of film which has a desired vapor transmission rate, and it may include, without limitation, vinylidene chloride copolymer films, polystyrene, polypropylene or polyethylene terephthalate. Also, the casing may be material which has been microperforated, with the microperforations being of any desired size, and the term porous includes such structure.

While the preferred manner of forming the controlled rate vapor transmitting casing 23 described above is by heat shrinking, it will be appreciated that the controlled vapor transmission casing can be applied in conforming relationship to the adsorbent in any suitable manner.

While the adsorbent described above has been in the nature of a desiccant to adsorb water vapor from an environment at a controlled rate, it will be appreciated that the adsorbent can contain one or more additional desired adsorbent compounds for adsorbing any other undesirable gaseous or vaporous substances, and as noted above, it may be by way of example and not of limitation, carbon, potassium permanganate, ferrous salts/oxides, calcium and sodium hydroxides, or mixtures of suitable compounds.

While the above disclosure has referred to a casing 23 having a controlled vapor transmission rate, it will be appreciated that under certain circumstances this feature may not be required, in which event the casing may be of a type which permits rapid passage of water vapor. In this respect, such a casing may be used when the combined stabilizing and adsorbent unit is taken from a package and placed in the disc drive after a short period of time, and the disc drive is packaged in a plastic envelope shortly thereafter.

While preferred embodiments of the present invention have been disclosed, it will be appreciated that the present invention is not limited thereto but may be otherwise embodied within the scope of the following claims.

What is claimed is:

1. A combined controlled rate adsorbent and computer disc drive stabilizing unit in the shape of a computer disc for placement into a disc drive in the position normally occupied by a computer disc for stabilizing the disc drive during transit comprising a sheet of adsorbent material, casing means of porous material encasing said sheet of adsorbent material and having a predetermined water vapor transmission rate for controlling the water vapor adsorption rate of said adsorbent material so that exposure of said controlled rate adsorbent unit to high humidity atmospheric conditions will not prevent said adsorbent unit from remaining active for prolonged periods of time, self-sustaining jacket means in the shape of a computer disc envelope and of a size for fitting into said disc drive in the manner of a computer disc, said jacket means enveloping said casing means, and opening means in said jacket means for permitting said casing means to communicate with the atmosphere to permit said sheet of adsorbent material encased therein to adsorb water vapor therefrom.

2. A controlled rate adsorbent unit as set forth in claim 1 wherein said adsorbent material comprises adsorbent paper.

3. A controlled rate adsorbent unit as set forth in claim 1 including a humidity indicator which is visible through said opening means.

4. A controlled rate adsorbent unit as set forth in claim 1 wherein said adsorbent material comprises adsorbent paper, a humidity indicator printed on said adsorbent paper in alignment with said opening means, and wherein said casing is transparent to permit viewing of said humidity indicator therethrough and through said opening means.

5. A combined adsorbent and computer disc drive stabilizing unit for placement into a disc drive in the position normally occupied by a computer disc for stabilizing the disc drive during transit comprising a substantially planar desiccant, a casing confirming said substantially planar desiccant therein to prevent dust from said desiccant from being deposited on the disc drive, and self-sustaining jacket means in the shape of a computer disc envelope of a size for fitting into said disc drive in the manner of a computer disc said jacket means enveloping said substantially planar desiccant, and opening means in said jacket means for permitting said substantially planar desiccant to communicate with the atmosphere to absorb water vapor therefrom.

6. A combined controlled rate adsorbent and computer disc drive stabilizing unit in the shape of a computer disc for placement into a disc drive in the position normally occupied by a computer disc for stabilizing the disc drive during transit comprising a sheet of adsorbent material, casing means of porous material encasing said sheet of adsorbent material and having a predetermined water vapor transmission rate for controlling the water vapor adsorption rate of said adsorbent material so that exposure of said controlled rate adsorbent unit to high humidity atmospheric conditions will not prevent said adsorbent unit from remaining active for prolonged periods of time, and self-sustaining jacket means in the shape of a computer disc envelope and of a size for fitting into said disc drive in the manner of a computer disc said jacket means enveloping said casing means.

* * * * *

UNITED STATES PATENT AND TRADEMARK OFFICE
CERTIFICATE OF CORRECTION

PATENT NO. : 5,148,337
DATED : September 15, 1992
INVENTOR(S) : John S. Cullen et al It is certified that error appears in the above-identified patent and that said Letters Patent is hereby corrected as shown below:

Column 2, line 29, change "G-145" to --SG-145--.

Column 4, line 64 (claim 5), change "confirming" to --confining--.

Signed and Sealed this

Twenty-eighth Day of September, 1993

Attest:

BRUCE LEHMAN

Attesting Officer                Commissioner of Patents and Trademarks

UNITED STATES PATENT AND TRADEMARK OFFICE
CERTIFICATE OF CORRECTION

PATENT NO. : 5,148,337
DATED : September 15, 1992
INVENTOR(S) : John S. Cullen, et al.

It is certified that error appears in the above-indentified patent and that said Letters Patent is hereby corrected as shown below:

Column 2, line 29, change "G-145" to --SG-145--.

Column 4, line 64 (claim 5), change "confirming" to --confining--.

This certificate supercedes Certificate of Correction issued September 28, 1993.

Signed and Sealed this

Ninth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,148,337
DATED : September 15, 1992
INVENTOR(S) : John S. CULLEN ET AL It is certified that error appears in the above-identified patent and that said Letters Patent is hereby corrected as shown below:

Column 2, line 29, change "G-145" to --SG-145--.

Column 4, line 64, (claim 5), change "confirming" to --confining--

Column 5, line 1 (claim 5), after "disc" insert --,--.

Column 6, line 10 (claim 6), after "disc" insert --,--.

This certificate supersedes Certificate of Corrections issued September 28, and November 9, 1993.

Signed and Sealed this

Fourth Day of January, 1994

*Attest:*

BRUCE LEHMAN

*Attesting Officer*    *Commissioner of Patents and Trademarks*